March 25, 1958     M. T. MARIETTA     2,827,900
RESPIRATOR PROTECTING SHELL
Filed March 23, 1956     2 Sheets-Sheet 1
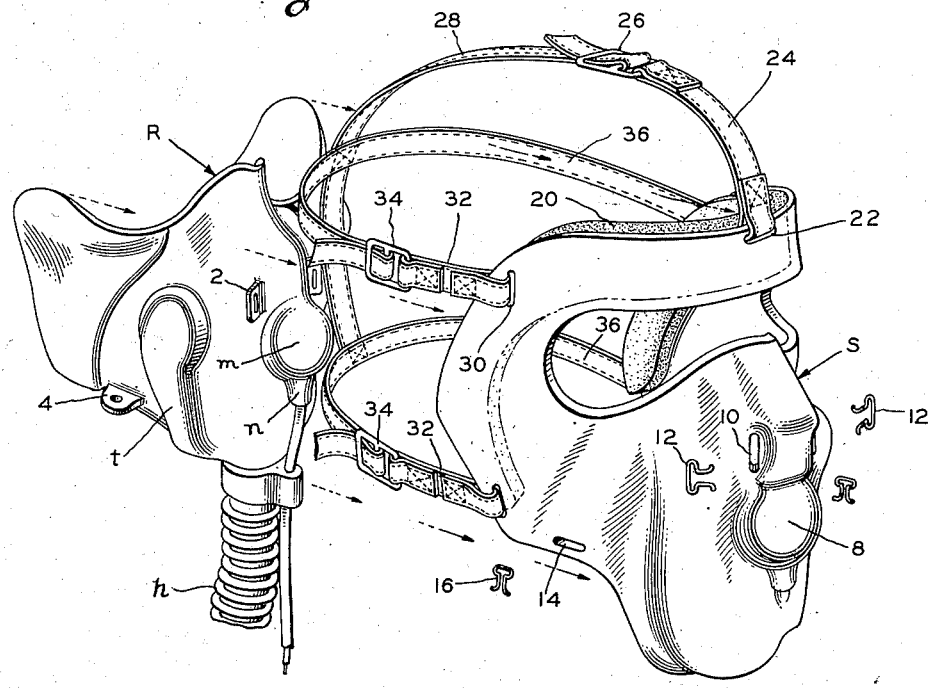
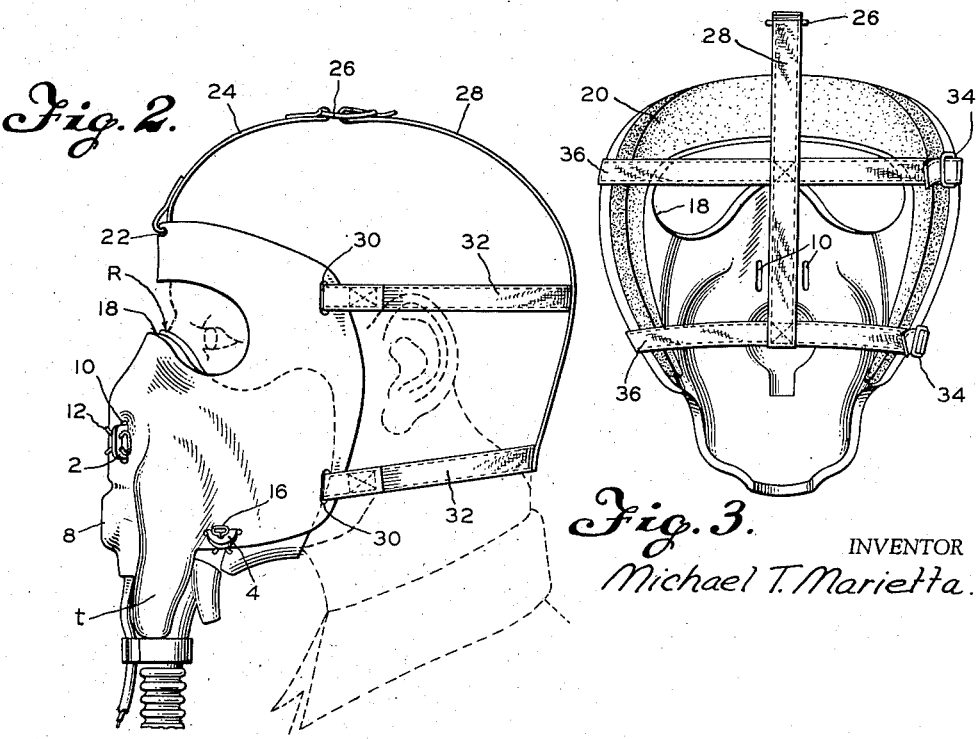
INVENTOR
Michael T. Marietta.

United States Patent Office 2,827,900
Patented Mar. 25, 1958

2,827,900

RESPIRATOR PROTECTING SHELL

Michael T. Marietta, Dallas, Tex.

Application March 23, 1956, Serial No. 573,413

1 Claim. (Cl. 128—141)

The present invention relates to respirators worn by jet pilots at high altitudes and made of soft rubber and including oxygen tubes of that material which are liable to collapse when owing to high speed increased pressure is encountered. Collapsing of these soft rubber tubes would cut the pilot's breathing organs off from the supply of oxygen or at least decrease the available supply thereof, thus endangering the life of the pilot and safety of the aircraft piloted by him.

The object of the invention is the provision of a shell of hard material enclosing the convex side of the respirator and preventing the oxygen supplying tubes thereof from collapsing under flight conditions mentioned above.

Another object of the invention is to provide releasable means connecting the shell of hard material to the respirator and other disconnectible means securing the shell and respirator lodged therein to the pilot's head.

With these objects in view and others which will become apparent as the invention is fully understood, the same resides in the combination, construction and arrangement of elements fully described in the below description, concluding with the subjoined claim particularly pointing out and distinctly claiming the subject matter which applicant regards as his invention.

The description is illustrated in the accompanying drawing, forming part of the application and wherein:

Fig. 1 is a perspective view of a respirator including features of my invention, of a hard-material shell, detached from the respirator, and constituting the preferred embodiment of my invention, and equipped with strap means for securing the shell to the pilot's head.

Fig. 2 is a side view of a respirator and shell in cooperating relation worn by a pilot;

Fig. 3 is a rear view of the shell including the straps;

The respirator R shown to the left of Fig. 1 is of soft rubber for sealingly engaging the face of the pilot and is supplied with oxygen through tubes $t$ which communicate with a flexible tubing $h$ leading to an oxygen reservoir (not shown). The respirator also includes a substantially cylindrical outwardly bulging part $m$ lodging on its inside the microphone and having at its lower end a sleeve $n$ for the microphone cord.

In order to adapt the conventional respirator above described for efficient cooperation with the shell, the respirator is provided on its outer side and preferably above the bulging part $m$ with a pair of laterally and forwardly extending slotted rubber ribs 2 for a purpose which will become clear as the description proceeds. The respirator is further equipped on either side with an outwardly projecting apertured flange 4 the function of which will be explained in the following description.

Figure 5:
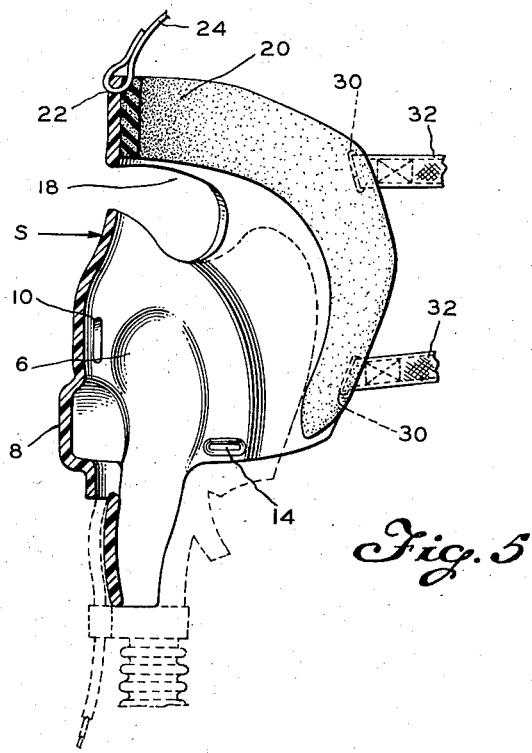
Fig. 5 is a view, looking sideways, of the inside of the symmetrical half of the shell to the right of the plane of symmetry indicated by line 5—5 of Fig. 3.

S denotes a shell of material sufficiently hard to protect tubes $t$ of the respirator from collapsing when high pressure is encountered. The concave side of the shell generally fits the outer convex side of the respirator and, in particular, forms with the outer marginal zone of the respirator's outer convex side a hermetic seal (Figs. 2 and 5). The shell is provided on its inner side with grooves 6 each accommodating one of the collapsible tubes $t$ (Fig. 5), protected from air pressure by the above described seal and includes an outwardly bulging part 8 concave on its inner side and adapted to house the part $m$ of the respirator. Above part 8 are two elongated slots 10 each adapted to receive a rib 2 when the respirator is inserted into the shell. 12 denotes each of a pair of generally U-shaped resilient cotter pins the legs of which terminate in end portions disposed parallel to the bight of the pin. Each pin 12 with its leg pressed toward one another can be inserted through a slot 10 of a rib 2 and on release of pressure upon the legs the terminal ends thereof will defy extraction of the pin from its slot.

The shell is also provided on either side part with a slot 14, aligned with and receiving a flange 4 when the respirator is placed in the shell. Pins 16 are substantial duplicates of pins 12 and are insertible in a hole of a flange 4 for the purpose of pins 12.

Figure 4:
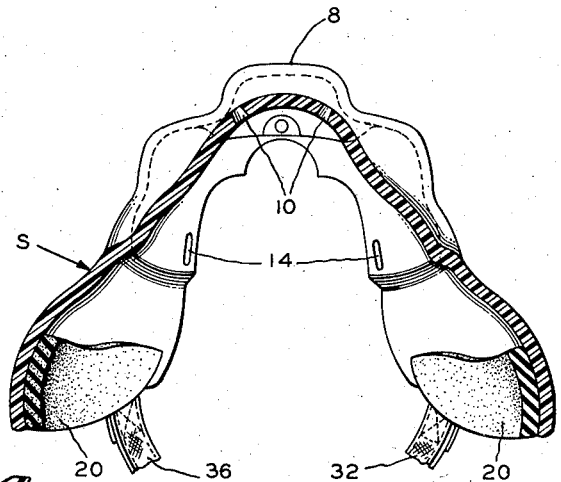
Fig. 4 is an inside view of the shell section below a horizontal plane indicated by line 4—4 in Fig. 3.

The shell has in its upper central part an opening 18 for the eyes of the pilot. The inner shell surface above the eye opening 18 is lined with a padding 20 of foam rubber and the like, extending also downwardly along the rear edges of the shell (Figs. 4 and 5).

The forehead portion of the shell is provided with a horizontal slot 22 through which is threaded the end portion of a strap 24 attached to the rest thereof to form a loop. Strap 24 extending rearwardly above the head of the pilot and substantially in the plane of symmetry carries at the other end a buckle 26, connecting the strap 25 to a strap 28.

Each lateral edge portion of the shell has two slots 30 in spaced relation each of which carries the looped end portion of a strap 32 which is connected by a buckle 34 to another strap 3c. The looped end portion of each strap 36 is threaded through a slot 30 on the other side edge of the shell. Strap 28 is connected to straps 36. The straps hold the shell and respirator in perfect sealing against the face of the wearer.

The assembly of respirator and shell has been described in details by way of example rather than by way of limitation, for changes and modifications such as readily occur to the expert in the art, may be made without departing from the scope and spirit of the invention as defined in the appended claim.

What I claim and desire to protect by Letters Patent is:

In an airpilot's respiratory equipment, the combination comprising a soft-rubber respirator sealingly engaging with its outer marginal zone of its concave side the face of the pilot and including a pair of soft-rubber tubes disposed on the outer or convex side of the respirator, a shell of hard material resisting the pressure at high speed and having a concave side engageable with the convex side of the respirator and providing with the outer marginal zone of the respirator's convex side a hermetical seal to protect the tubes from collapsing at a certain pressure and provided on its inner side with grooves each accommodating a tube on the respirator and having slots, means projecting outwardly from the respirator and each received in a slot and other detachable means each preventing extraction of one of the first means from its slot.

References Cited in the file of this patent

UNITED STATES PATENTS

| | | |
|---|---|---|
| 2,260,701 | Boothby | Oct. 28, 1941 |
| 2,388,674 | Browne | Nov. 13, 1945 |
| 2,398,076 | Bulbulian | Apr. 9, 1946 |